(12) United States Patent
Eto

(10) Patent No.: US 10,926,703 B2
(45) Date of Patent: Feb. 23, 2021

(54) DOOR MIRROR APPARATUS FOR VEHICLE

(71) Applicant: KABUSHIKI KAISHA HONDA LOCK, Miyazaki (JP)

(72) Inventor: Yasuyuki Eto, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 118 days.

(21) Appl. No.: 16/331,864

(22) PCT Filed: Aug. 30, 2017

(86) PCT No.: PCT/JP2017/031183
§ 371 (c)(1),
(2) Date: Mar. 8, 2019

(87) PCT Pub. No.: WO2018/056006
PCT Pub. Date: Mar. 29, 2018

(65) Prior Publication Data
US 2019/0375331 A1 Dec. 12, 2019

(30) Foreign Application Priority Data
Sep. 20, 2016 (JP) .................................. 2016-182686

(51) Int. Cl.
*B60R 1/072* (2006.01)
*B60R 1/074* (2006.01)
(Continued)

(52) U.S. Cl.
CPC .............. *B60R 1/072* (2013.01); *B60R 1/074* (2013.01); *A47B 88/457* (2017.01); *B60R 1/12* (2013.01);
(Continued)

(58) Field of Classification Search
None
See application file for complete search history.

(56) References Cited

U.S. PATENT DOCUMENTS 7,488,081 B2 2/2009 Yoshida et al.
9,981,606 B2 5/2018 Umino et al.
(Continued)

FOREIGN PATENT DOCUMENTS

JP 2001-151020 A 6/2001
JP 2001-258199 A 9/2001
(Continued)

OTHER PUBLICATIONS

Official Communication issued over the corresponding Japanese Patent Application No. 2016-182686, dated Oct. 2, 2019.
(Continued)

*Primary Examiner* — Jennifer D. Carruth
(74) *Attorney, Agent, or Firm* — Carrier Blackman & Associates, P, C.; William D. Blackman; Joseph P Carrier

(57) ABSTRACT

A door mirror apparatus for a vehicle is provided in which an electric motor is housed within an actuator case disposed within a mirror housing, and the actuator case includes a case member fixed to the mirror housing and a cover member that has a holder support part swingably supporting the mirror holder and is joined to the case member, wherein a motor shaft projects from one end portion along an axial direction of a motor housing of the electric motor, and an end face support projection part that is in line contact with one end portion among opposite end faces in the axial direction of the motor housing is provided integrally with one of the case member and the cover member. This makes it difficult for vibration of the electric motor to be transmitted to the actuator case, thus enabling reduction in noise when operating the electric motor.

16 Claims, 13 Drawing Sheets

(51) Int. Cl.
 *A47B 88/457* (2017.01)
 *B60R 1/12* (2006.01)
(52) U.S. Cl.
 CPC ... *E05Y 2201/426* (2013.01); *E05Y 2201/434* (2013.01)

(56) References Cited

U.S. PATENT DOCUMENTS

| | | | |
|---|---|---|---|
| 2007/0092368 A1* | 4/2007 | Yoshida | B60R 1/074 |
| | | | 415/53.1 |
| 2012/0134038 A1* | 5/2012 | Sumi | B60R 1/062 |
| | | | 359/872 |
| 2012/0134040 A1* | 5/2012 | Kudo | B60R 1/072 |
| | | | 359/877 |
| 2013/0070358 A1* | 3/2013 | Suzuki | B60R 1/072 |
| | | | 359/877 |
| 2013/0107386 A1* | 5/2013 | Sobecki | B60R 1/074 |
| | | | 359/877 |
| 2014/0233125 A1* | 8/2014 | Suzuki | B60R 1/072 |
| | | | 359/877 |
| 2016/0264055 A1* | 9/2016 | Chong | B60R 1/072 |
| 2017/0282802 A1* | 10/2017 | Sugimura | B60R 1/072 |
| 2019/0031103 A1* | 1/2019 | Yoshida | B60R 1/07 |
| 2019/0210529 A1* | 7/2019 | Izumi | B60R 1/025 |

FOREIGN PATENT DOCUMENTS

| | | |
|---|---|---|
| JP | 2003-335175 A | 11/2003 |
| JP | 2007-106311 A | 4/2007 |
| JP | 4490856 B2 | 6/2010 |
| JP | 2016-107816 A | 6/2016 |

OTHER PUBLICATIONS

Official Communication issued over the corresponding Japanese Patent Application No. 2016-182686, dated May 29, 2019.

* cited by examiner

DOOR MIRROR APPARATUS FOR VEHICLE

TECHNICAL FIELD

The present invention relates to a door mirror apparatus for a vehicle, in which an electric motor that exerts power to swing a mirror holder holding a mirror is housed within an actuator case disposed within a mirror housing that has a mirror housing recess part housing the mirror and is supported on a front side door of the vehicle, and the actuator case includes a case member that is fixed to the mirror housing and a cover member that has a holder support part swingably supporting the mirror holder and is joined to the case member.

BACKGROUND ART

A door mirror apparatus for a vehicle in which a rotational reaction force received by an electric motor housed within an actuator case is received by the actuator case via a portion where vibration of the electric motor is low, and the rotational reaction force of the electric motor is thereby received while suppressing the occurrence of noise due to vibration of the electric motor is known from Patent Document 1.

RELATED ART DOCUMENTS

Patent Documents

Patent Document 1: Japanese Patent No. 4490856

SUMMARY OF THE INVENTION

Problems to be Solved by the Invention

The smaller the contact area between members abutting against each other, the more difficult it is for vibration to be transmitted; in the arrangement disclosed in Patent Document 1 above the actuator case is in surface contact with opposite end faces in the axial direction of the motor housing, and the transmission of vibration of the motor housing to the actuator case is not suppressed.

The present invention has been accomplished in light of such circumstances, and it is an object thereof to provide a door mirror apparatus for a vehicle that makes it difficult for vibration of an electric motor to be transmitted to an actuator case, thus enabling the noise when operating the electric motor to be reduced.

Means for Solving the Problems

In order to attain the above object, according to an aspect of the present invention, there is provided a door mirror apparatus for a vehicle, in which an electric motor that exerts power to swing a mirror holder holding a mirror is housed within an actuator case disposed within a mirror housing that has a mirror housing recess part housing the mirror and is supported on a front side door of the vehicle, and the actuator case comprises a case member that is fixed to the mirror housing and a cover member that has a holder support part swingably supporting the mirror holder and is joined to the case member, characterized in that a motor shaft projects from an end face of one end portion along an axial direction of a motor housing of the electric motor, and an end face support projection part that is in line contact or point contact with the end face of at least the one end portion among opposite end faces in the axial direction of the motor housing is projectingly provided integrally with at least one of the case member and the cover member.

Effects of the Invention

In accordance with the aspect of the present invention, the transmission of vibration of the electric motor to the actuator case can be suppressed effectively. That is, in accordance with the results of analyzing the vibrational characteristics of the electric motor by the inventor of the present application, the level of vibration of the one end portion on the side on which the motor shaft projects in the axial direction of the electric motor is the largest, and it becomes possible, by making the shape of the end face support projection part, which is in contact with the end face of the motor housing via the portion where the vibration level is high, as a shape that is in line contact or point contact with the end face, to suppress effectively the transmission of vibration from the electric motor to the actuator case, thus enabling noise when operating the electric motor to be reduced.

EXPLANATION OF REFERENCE NUMERALS AND SYMBOLS

Figure 1:
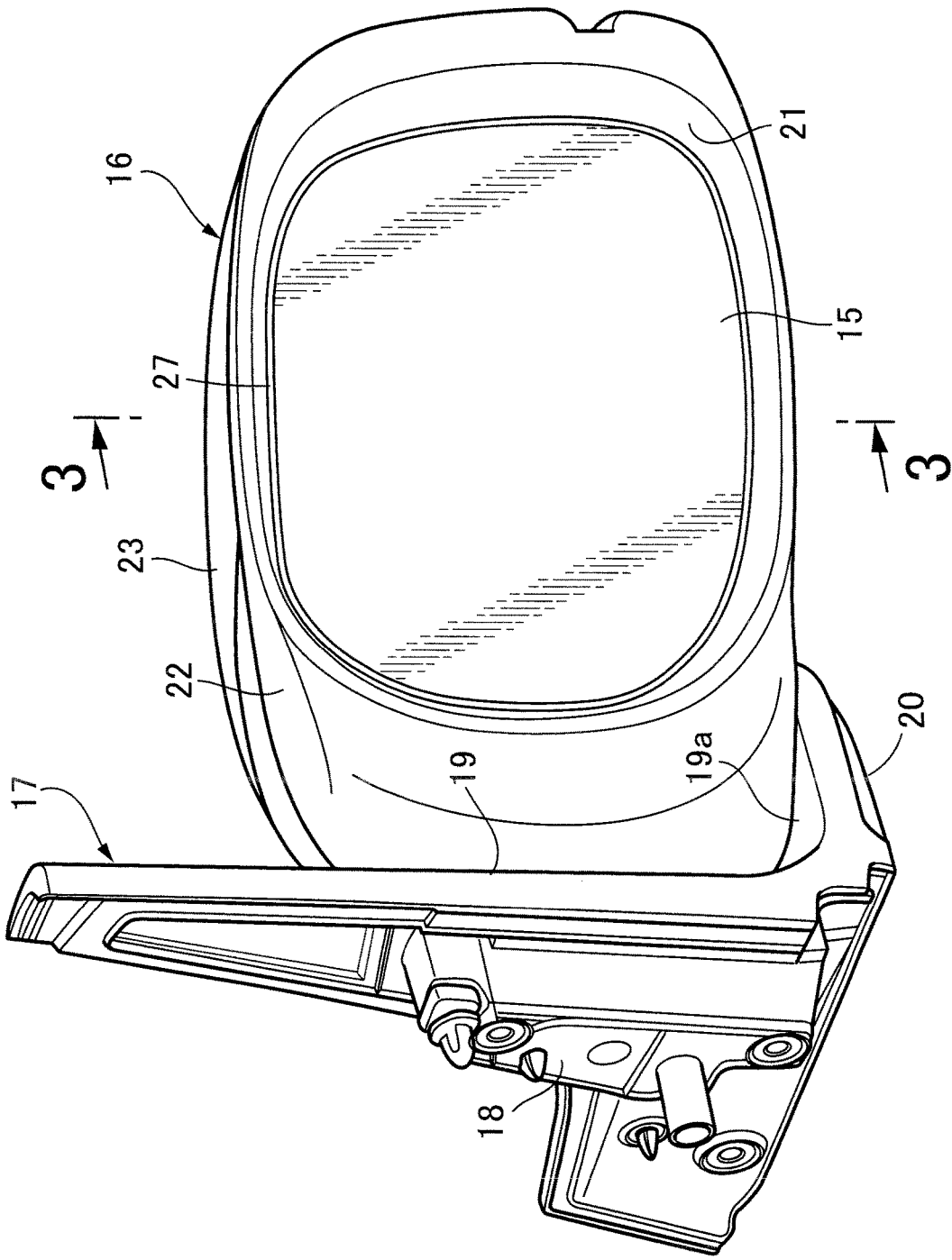
FIG. 1 is a perspective view of a door mirror apparatus when viewed from the rear in the fore-and-aft direction of a vehicle. (first embodiment)

15 Mirror
16 Mirror housing
21 Mirror housing recess part
27 Mirror holder
31 Actuator case
33 Case member
34 Cover member
35 Holder support part
40 Electric motor
41 Motor shaft 60 Motor housing
60a One end portion along axial direction of motor housing
78 End face support projection part

MODES FOR CARRYING OUT THE INVENTION

An embodiment of the present invention is explained below by reference to the attached FIG. 1 to FIG. 13.

First Embodiment

Figure 2:
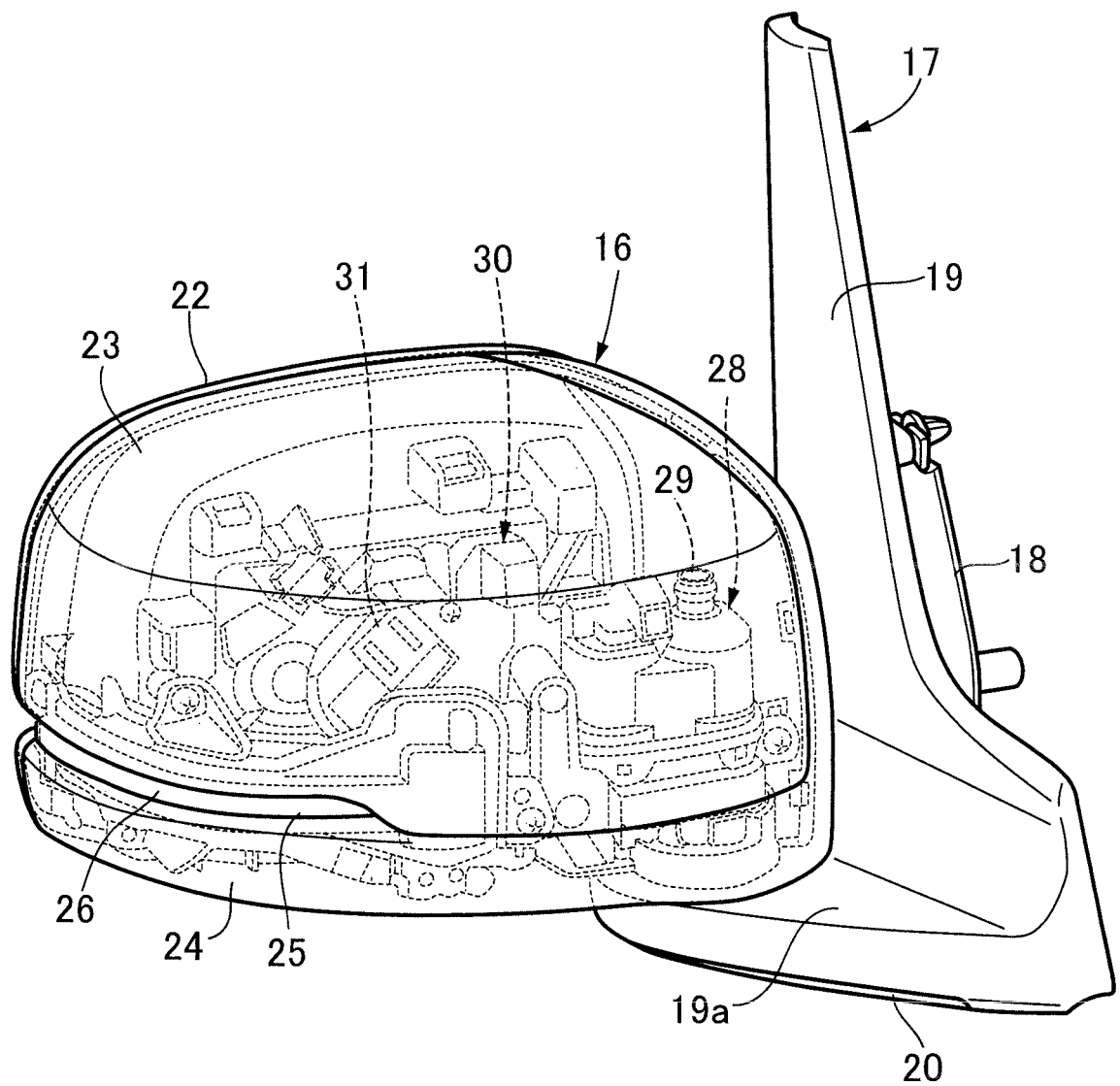
FIG. 2 is a perspective view of the door mirror apparatus when viewed from the front in the fore-and-aft direction of the vehicle. (first embodiment)

First, in FIG. 1 and FIG. 2, a mirror housing 16 having a mirror 15 fitted thereinto is disposed on left and right front side doors in a passenger vehicle so that the mirror housing 16 can pivot between an operating position, in which it projects sideways from the front side door, and a retracted position in which it is retracted toward the front side door side.

Mounted on the front side door is a mirror base 17 pivotably supporting the mirror housing 16, the mirror base 17 being formed from an inner base 18 die-molded from a light metal and mounted on the front side door and first and second base covers 19 and 20 covering the inner base 18. The first base cover 19 is formed into a shape that covers the inner base 18 from the outside while having a support arm portion 19a projecting sideways from the front side door, and the second base cover 20 is connectedly provided on a lower part of the first base cover 19 so as to cover the support arm portion 19a from below.

Figure 3:
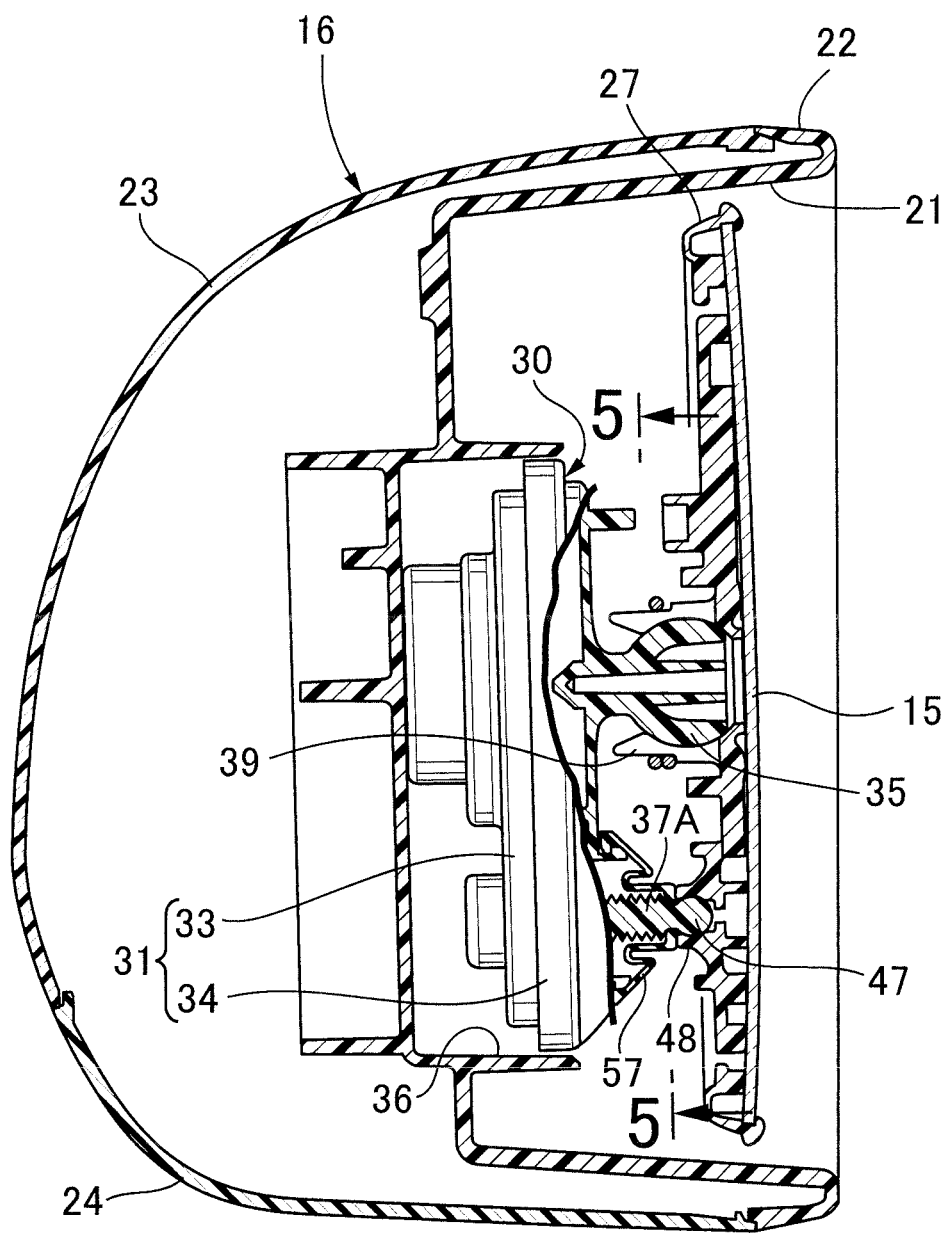
FIG. 3 is a sectional view along line 3-3 in FIG. 1. (first embodiment)
Figure 4:
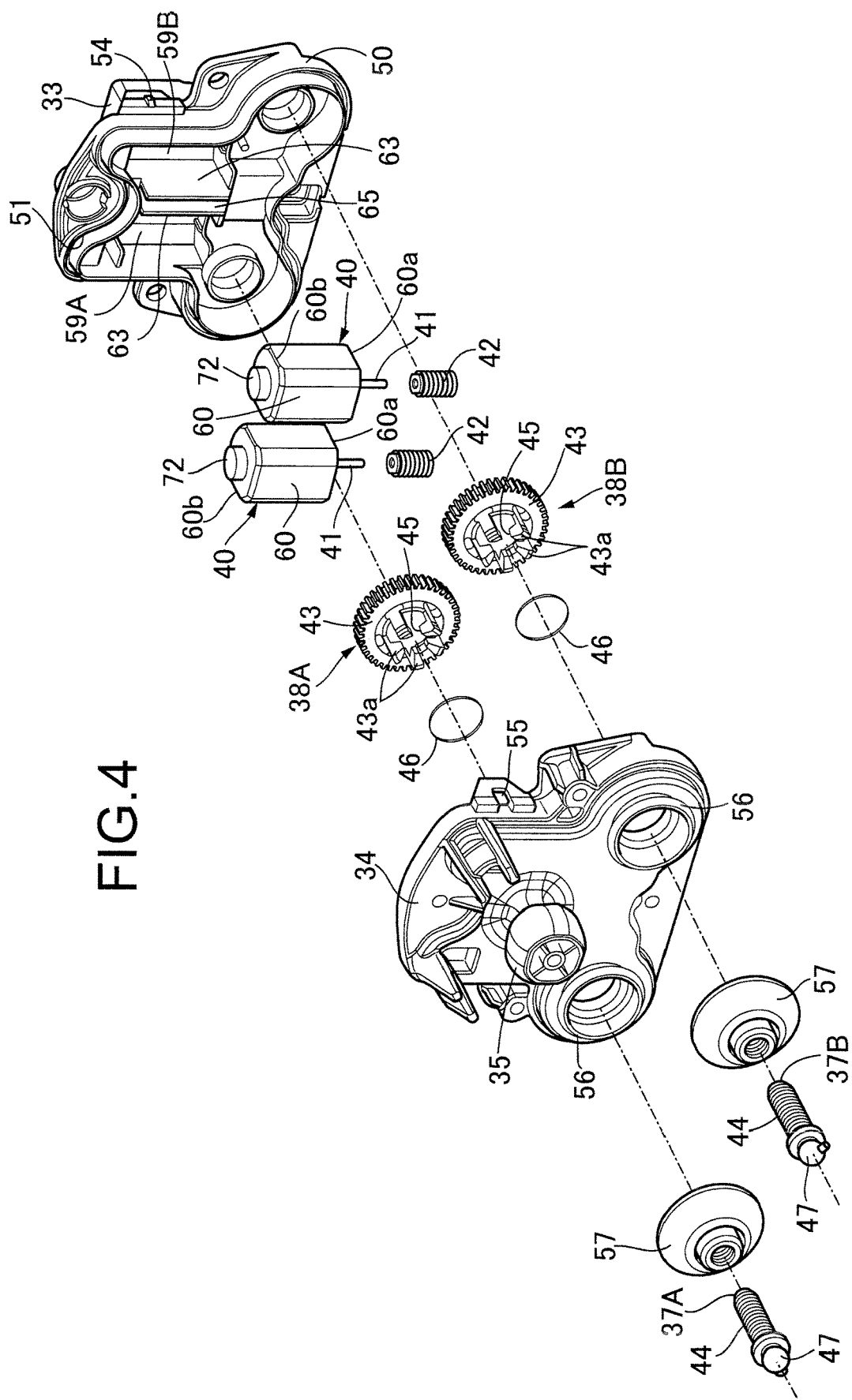
FIG. 4 is an exploded perspective view of an actuator. (first embodiment)
Figure 5:
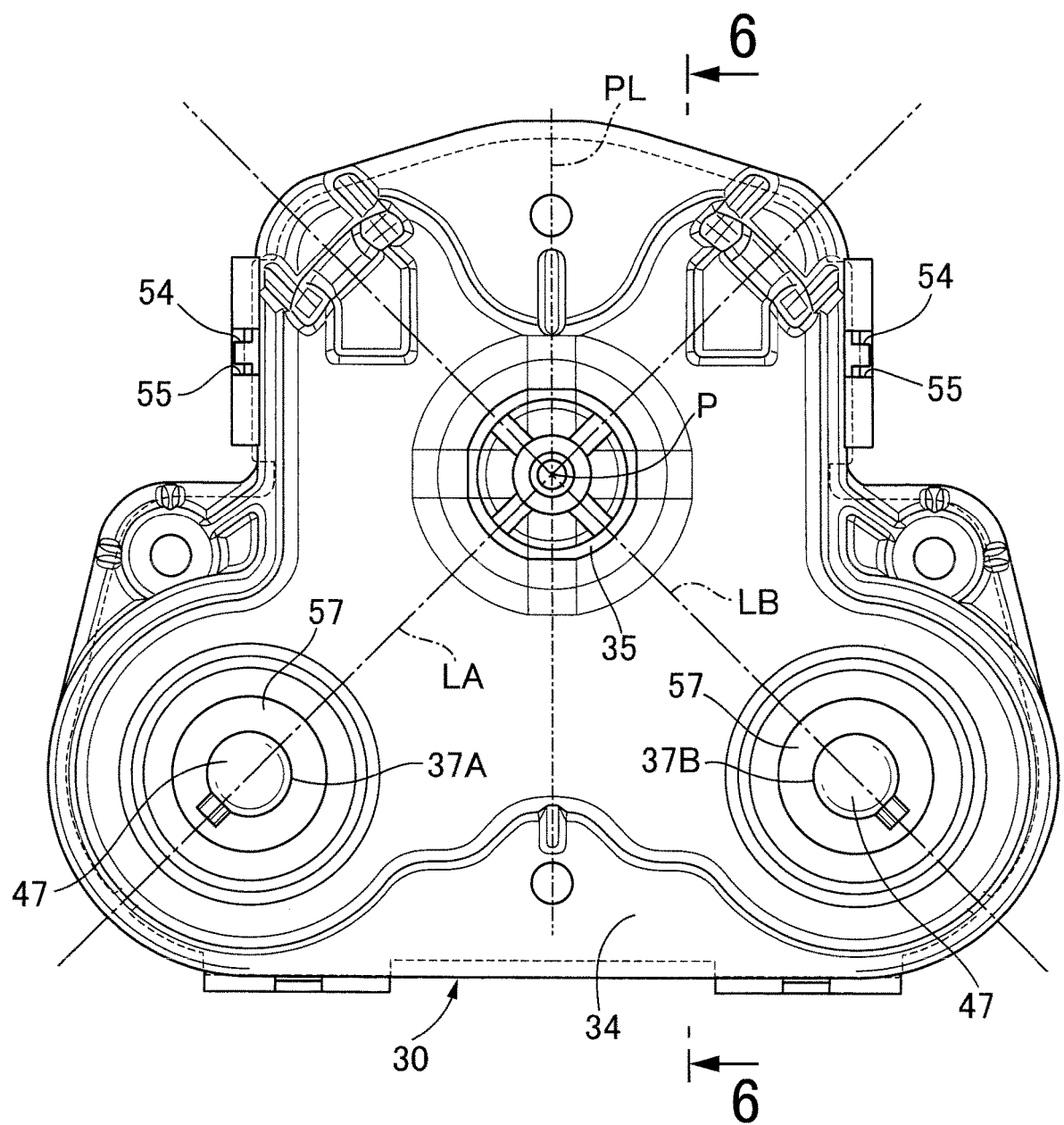
FIG. 5 is a front view of the actuator when viewed in the direction of arrowed line 5-5 in FIG. 3. (first embodiment)
Figure 6:
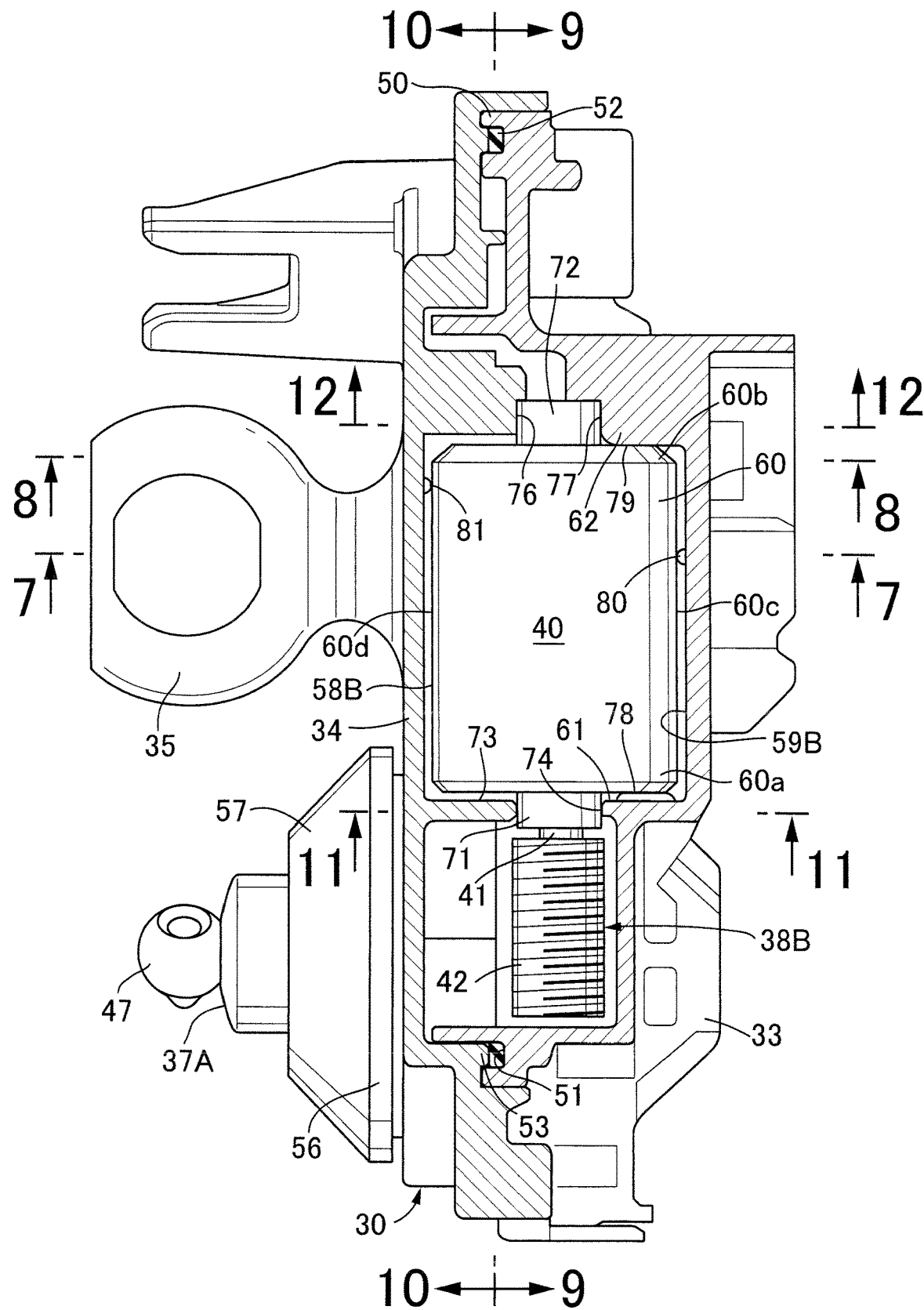
FIG. 6 is a sectional view along line 6-6 in FIG. 5. (first embodiment)
Figure 7:
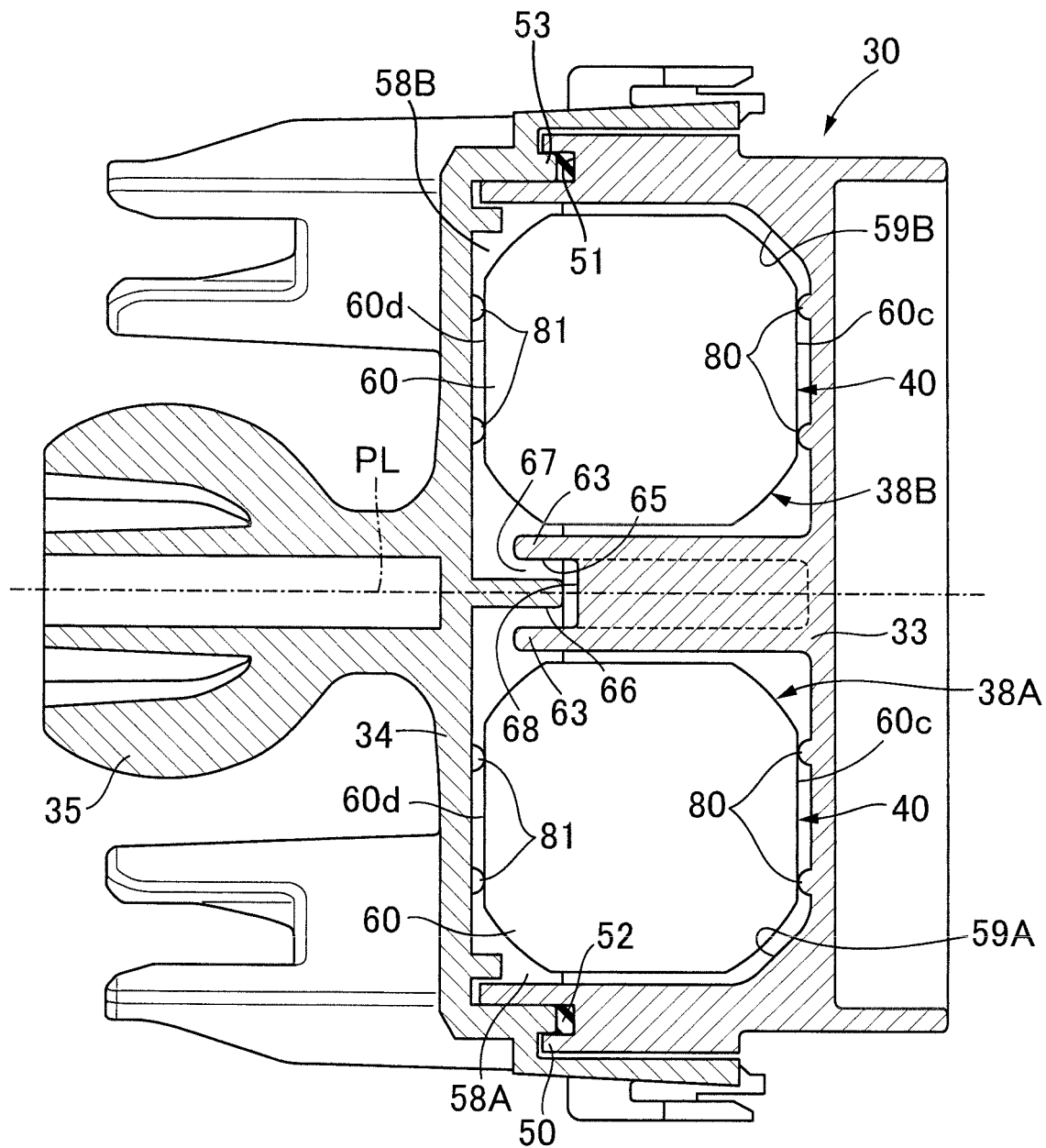
FIG. 7 is a sectional view along line 7-7 in FIG. 6. (first embodiment)
Figure 8:
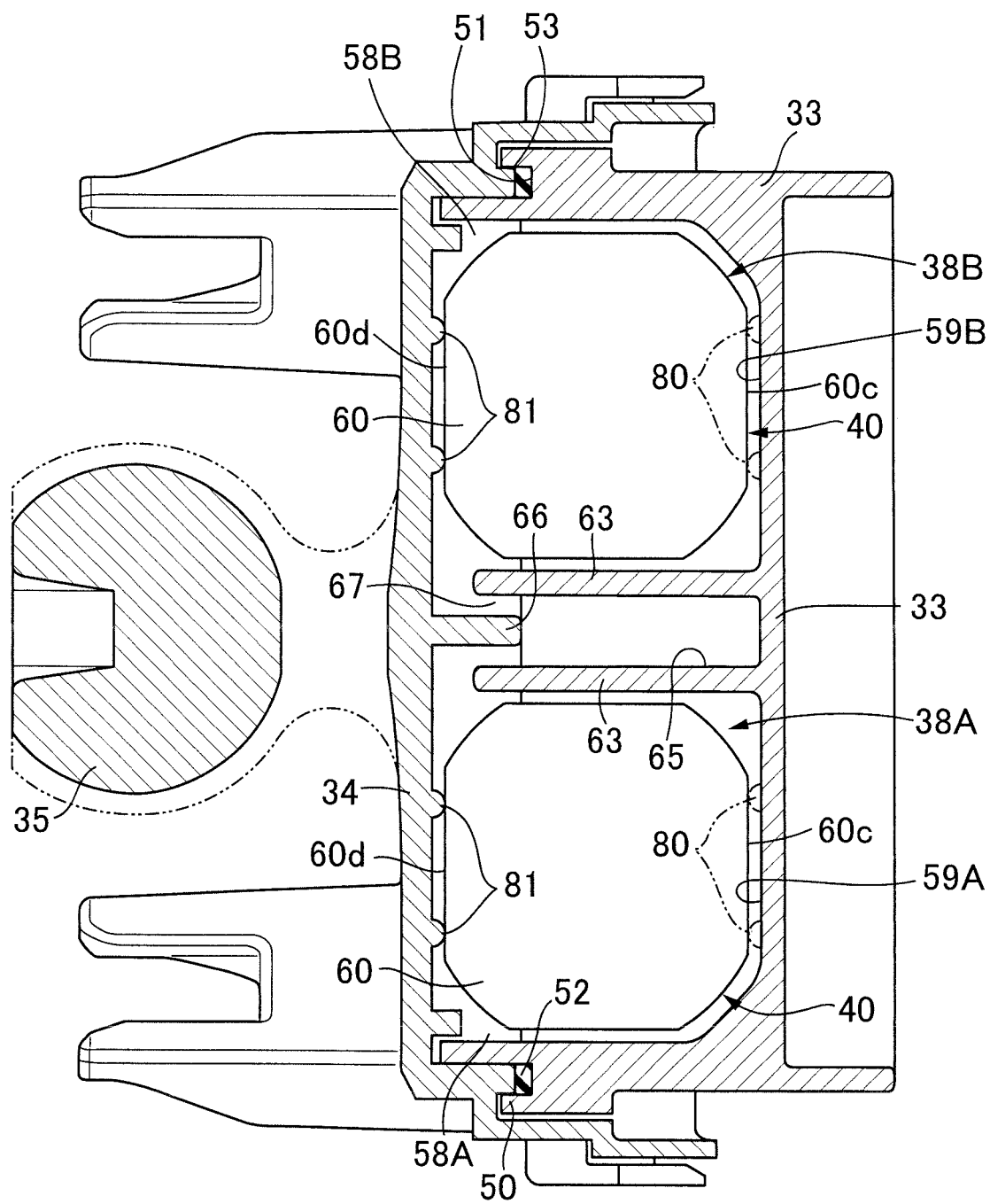
FIG. 8 is a sectional view along line 8-8 in FIG. 6. (first embodiment)

Referring in addition to FIG. 3, the mirror housing 16 is formed from a housing main body 22, made of a synthetic resin, having a mirror housing recess part 21 housing the mirror 15, an upper cover 23, made of a synthetic resin, covering the housing main body 22 from a direction opposite to the mirror 15, and a lower cover 24, made of a synthetic resin, covering a lower part of the housing main body 22 from below. A side turn lamp 26 is disposed in a slit 25 formed between the upper cover 23 and the lower cover 24, and the side turn lamp 26 is fastened to the housing main body 22.

The mirror 15 for viewing to the rear of the vehicle and a mirror holder 27, made of a synthetic resin, holding the mirror 15 are disposed in an opening of the housing main body 22, that is, an open end of the mirror housing recess part 21.

An electric first actuator 28 is housed within the mirror housing 16, the first actuator 28 is pivotably supported by a support shaft 29 standing on the support arm portion 19a of the mirror base 17 and extending into the mirror housing 16, and the housing main body 22 of the mirror housing 16 is mounted on the first actuator 28. That is, the housing main body 22 is supported, via the first actuator 28, on the support shaft 29 standing on the mirror base 17 mounted on the front side door, and the mirror housing 16 pivots between the operating position, in which it projects sideways from the front side door, and the retracted position, in which it is retracted toward the front side door by virtue of operation of the first actuator 28.

An actuator case 31 of a second actuator 30 is housed in and fixed to the interior of the mirror housing 16 while part thereof opposes the mirror holder 27, the mirror holder 27 is supported on the actuator case 31 so that it can swing to the left and the right in the vehicle width direction and swing in the vertical direction, and the mirror 15 and the mirror holder 27 are swung in response to operation of the second actuator 30.

Referring in addition to FIG. 4 to FIG. 8, the actuator case 31 is formed from a case member 33 fixed to the housing main body 22 of the mirror housing 16, and a cover member 34 that has a holder support part 35 swingably supporting the mirror holder 27 and is joined to the case member 33. An actuator housing recess portion 36 (see FIG. 3) fixedly housing the actuator case 31 so that the cover member 34 opposes the mirror holder 27 is formed in the mirror main body 22.

The mirror holder 27 is swingably supported on the holder support part 35 at an intersection point P between a first straight line LA and a second straight line LB orthogonal to the first straight line LA, and the actuator case 31 is fixedly housed in the actuator housing recess part 36 in an attitude so that the first straight line LA extends in the vertical direction and the second straight line LB extends in the horizontal direction. Moreover, first and second drive shafts 37A and 37B, for selectively pivotally swinging the mirror holder 27, project from the cover member 34 of the actuator case 31 so that they can move in the axis direction.

The first drive shaft 37A has an axis orthogonal to the first straight line LA and is disposed beneath the intersection point P, and one end part of the first drive shaft 37A is linked to the mirror holder 27 so that it can swivel within a plane containing the first straight line LA. The second drive shaft 37B has an axis orthogonal to the second straight line LB and is disposed outward of the intersection point P, and one end part of the second drive shaft 37B is linked to the mirror holder 27 so that it can swivel within a plane containing the second straight line LB.

Installed within the actuator case 31 are first drive means 38A that drives the first drive shaft 37A in the axial direction and second drive means 38B that drives the second drive shaft 37B in the axial direction. The first and second drive means 38A and 38B are disposed symmetrically with respect to a plane PL passing through the intersection point P between the first and second straight lines LA and LB and passing through the midpoint between the first and second drive shafts 37A and 37B and are housed in the actuator case 31.

The holder support part 35 is projectingly provided integrally with an outer face of the cover member 34 so that its axis is disposed at the intersection point P between the first and second straight lines LA and LB, and a receiving portion 39 (see FIG. 3) swingably fitted onto the holder support part 35, which has an arc-shaped cross section, is provided integrally with the mirror holder 27.

The first drive means 38A is formed from an electric motor 40, a worm gear 42 provided on a motor shaft 41 of the electric motor 40, and a worm wheel 43 meshing with the worm gear 42 and screwed around the first drive shaft 37A.

The worm wheel 43 is formed so as to coaxially surround the first drive shaft 37A and is rotatably supported on the case member 33. On the other hand, a male thread 44 is cut into an outer face of the first drive shaft 37A, and a plurality of, for example five, arm portions 43a having at the extremity inner teeth 45 screwed around the male thread 44 are connectedly provided integrally with the worm wheel 43 at equal intervals in the peripheral direction. A spring 46 is wound around all of the arm portions 43a, and by virtue of the spring force of the spring 46, the inner teeth 45 at the extremity of each arm portion 43a are screwed around the male thread 44 of the first drive shaft 37A.

The second drive means 38B is formed in the same manner as for the first drive means 38A, and members forming the second drive means 38B are denoted by the same reference numerals and symbols as those of members forming the first drive means 38A and only illustrated, detailed explanation thereof being omitted.

A spherical head part 47 is provided on an extremity part of the first and second drive shafts 37A and 37B, the spherical head part 47 being fitted into a fitting and linking portion 48 (see FIG. 3) provided on the mirror holder 27; the extremity part of the first drive shaft 37A is linked to the mirror holder 27 so that it is prevented from rotating around its axis but it can swivel within a plane containing the first straight line LA, and the extremity part of the second drive shaft 37B is linked to the mirror holder 27 so that it is prevented from rotating around its axis but it can swivel within a plane containing the second straight line LB.

Figure 9:
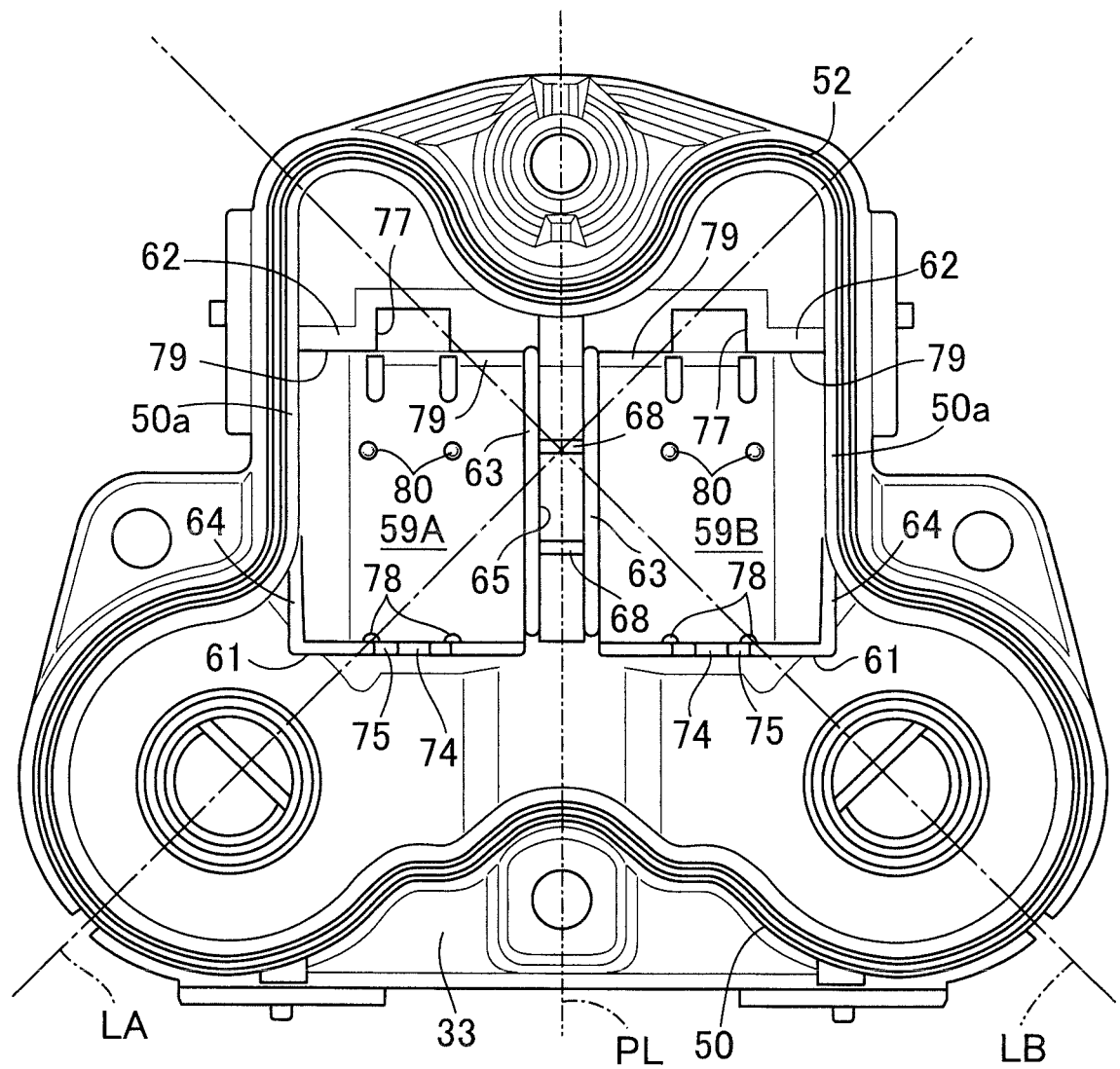
FIG. 9 is a view of a case member of an actuator case in the direction of arrowed line 9-9 in FIG. 6. (first embodiment)
Figure 10:
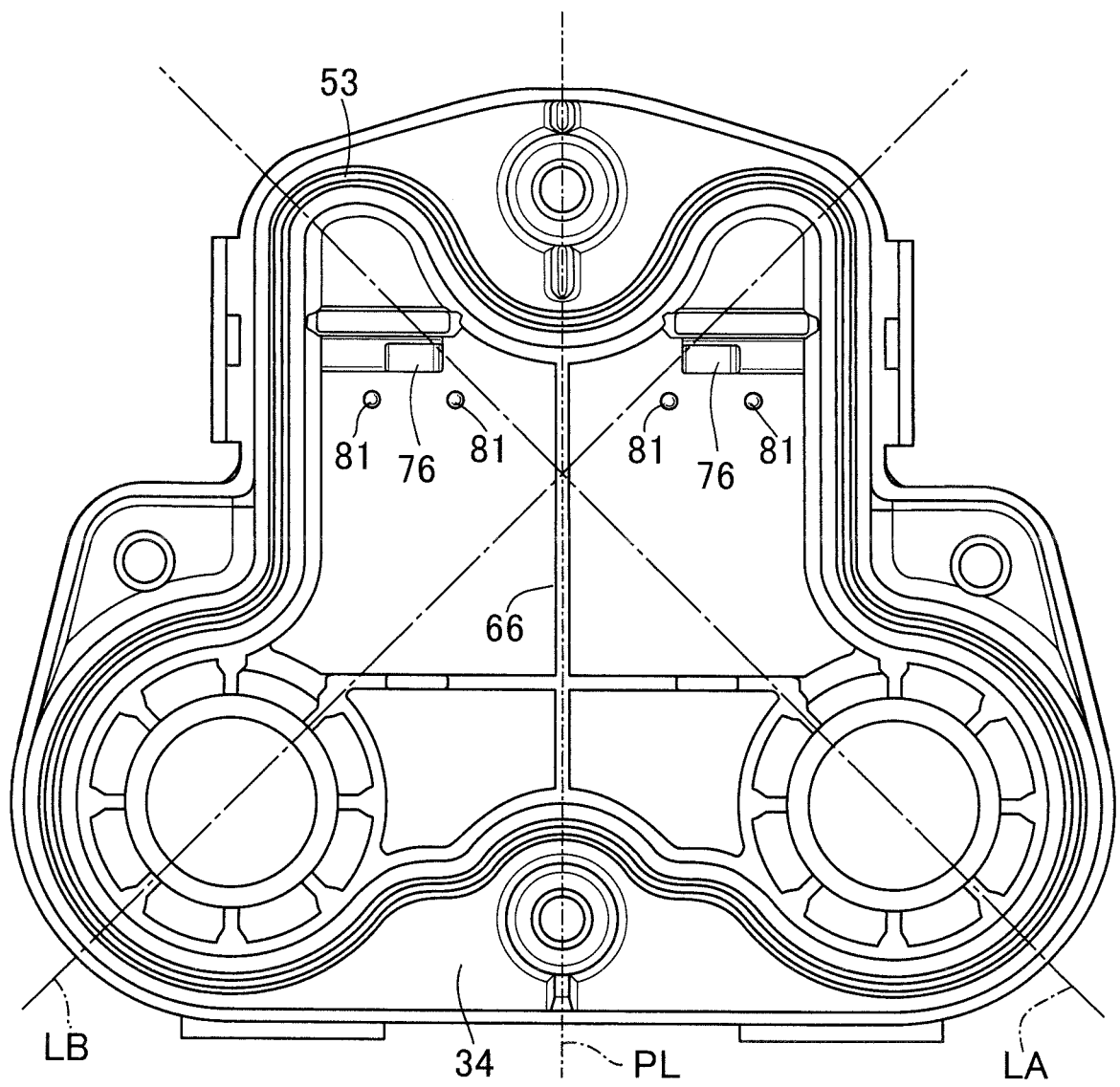
FIG. 10 is a view of a cover member of the actuator case in the direction of arrowed line 10-10 in FIG. 6. (first embodiment)

Referring in addition to FIG. 9 and FIG. 10, a peripheral wall 50, which is endlessly connected so as to surround the first and second drive means 38A and 38B, is provided at the peripheral edge of the case member 33 so as to project toward the cover member 34 side, an endlessly connected seal groove 51 is formed in an extremity part of the peripheral wall 50, and a seal member 52 is fitted into the seal groove 51. On the other hand, a fitting projection part 53 is projectingly provided integrally with the peripheral edge of the cover member 34 so that it is endlessly connected, the fitting projection part 53 being fitted into the seal groove 51 so as to sandwich the seal member 52 between itself and the case member 33.

In order to join the cover member 34 to the case member 33, an engagement claw 54 is projectingly provided at a plurality of locations of the peripheral wall of the case member 33, and a plurality of engagement holes 55 are provided in the cover member 34, the engagement claw 54 being resiliently engaged with the engagement hole 55.

A cylindrical part 56 is projectingly provided integrally with the cover member 34 so as to face the mirror holder 27 side, the first and second drive shafts 37A and 37B being made to project from respective cylindrical parts 56. Opposite end parts of a boot 57 surrounding each of the first and second drive shafts 37A and 37B are fitted onto an outer peripheral part of the cylindrical part 56 and an outer peripheral part close to the extremity of the first and second drive shafts 37A and 37B.

Formed on the actuator case 31 are a first electric motor housing chamber 58A housing the electric motor 40 of the first drive means 38A and a second electric motor housing chamber 58B housing the electric motor 40 of the second drive means 38B.

The first and second electric motor housing chambers 58A and 58B are formed symmetrically on opposite sides of the plane PL, which passes through the intersection point P between the first and second straight lines LA and LB and passes through the midpoint between the first and second drive shafts 37A and 37B, and are formed from first and second electric motor housing recess parts 59A and 59B provided on the case member 33 and the cover member 34, which is joined to the case member 33.

The first and second electric motor housing recess parts 59A and 59B are each formed into a rectangular shape from one end-side support wall part 61 projectingly provided on the case member 33 so as to closely oppose an end face of one end portion 60a, in the axial direction, of a motor housing 60 of the electric motor 40, another end-side support wall part 62 projectingly provided on the case member 33 so as to closely oppose an end face of the other end portion 60b, in the axial direction, of the motor housing 60, a first side wall 63 extending along the plane PL and providing a connection between the one end-side support wall part 61 and the other end-side support wall part 62, a side wall-forming portion 50a formed from part of the peripheral wall 50 of the case member 33 and extending in parallel with the first side wall 63, and a second side wall 64 projectingly provided on the case member 33 so as to extend from the one end-side support part 61 in parallel with the first side wall 63 and being connected to the side wall-forming portion 50a.

The first side walls 63 forming parts of the respective first and second electric motor housing recess parts 59A and 59B extend in parallel with each other on opposite sides of the plane PL, and a groove 65 opening toward the cover member 34 side is formed between the first side walls 63. On the other hand, a projecting wall 66 loosely inserted into the groove 65 and extending along the plane PL is projectingly provided on the cover member 34, which is joined to the case member 33. That is, the projecting wall 66 projectingly provided on the cover member 34 is loosely inserted into the groove 65, which is disposed between the first and second electric motor housing chambers 58A and 58B within the actuator case 31 and opens on the cover member 34 side, and a substantially U-shaped labyrinth passage 67 opening toward the cover member 34 side is thereby formed between the first and second electric motor housing chambers 58A and 58B.

Furthermore, a plurality of, for example two, reinforcing walls 68 providing a connection between the pair of first side walls 63 are provided on the case member 33, and the reinforcing wall 68 is formed so as to allow the projecting wall 66 to be inserted into the groove 65.

Coaxially and projectingly provided on the one end portion 60a, in the axial direction, of the motor housing 60 of the electric motor 40 is a first bearing part 71 supporting the motor shaft 41 so that it can rotate and so that one end part of the motor shaft 41 projects therefrom. Coaxially and projectingly provided on the other end portion 60b, in the axial direction, of the motor housing 60 is a second bearing part 72 formed into a bottomed cylindrical shape while supporting the other end part of the motor shaft 41 so that it can rotate. The worm gear 42 is fitted onto and fixed to a part, projecting from the first bearing part 71, of the motor shaft 41.

Moreover, flat faces 60c and 60d are formed on areas of the outer periphery of the motor housing 60 opposing the case member 33 and the cover member 34, the flat faces 60c and 60d closely opposing the case member 33 and the cover member 34.

Figure 11:
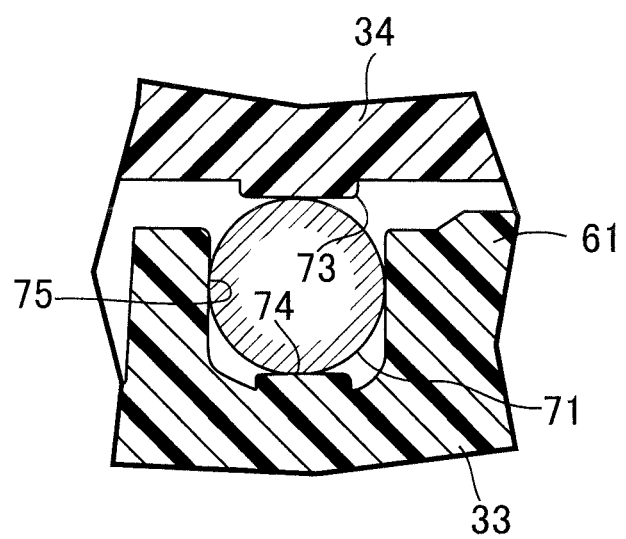
FIG. 11 is a sectional view along line 11-11 in FIG. 6. (first embodiment)

Referring in addition to FIG. 11, the first bearing part 71 on the one end portion 60a of the motor housing 60 is supported by the one end-side support wall part 61 and a first projecting part 73 projectingly provided on the cover member 34. Formed in the one end-side support wall part 61 is a first fitting recess part 75 having at its blocked end a support projection part 74 abutting against the first bearing part 71 from the side opposite to the cover member 34. The first bearing part 71 fitted into the first fitting recess part 75 is held between the support projection part 74 and the first projecting part 73 due to the cover member 34 being joined to the case member 33.

Figure 12:
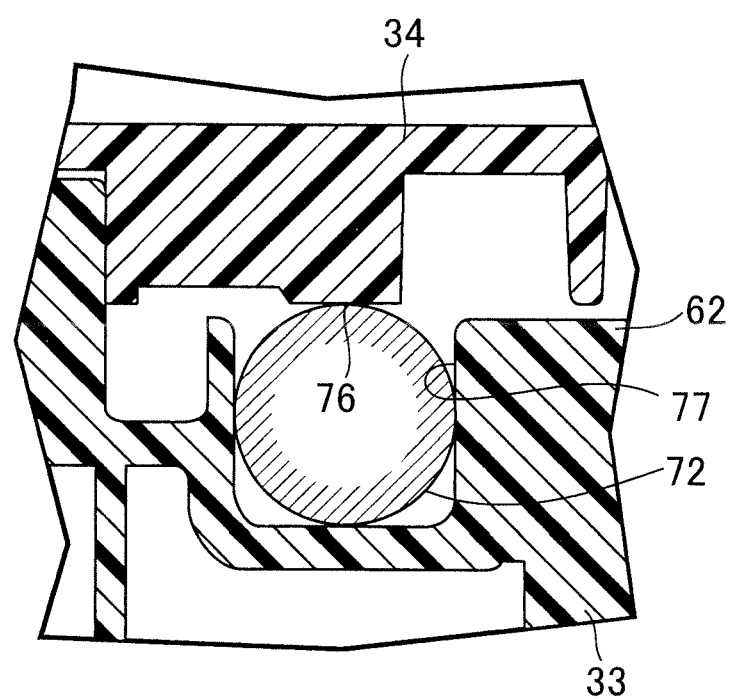
FIG. 12 is a sectional view along line 12-12 in FIG. 6. (first embodiment)

Referring in addition to FIG. 12, the second bearing part 72 of the other end portion 60b of the motor housing 60 is supported by the other end-side support wall part 62 and a second projecting part 76 projectingly provided on the cover member 34. Formed in the other end-side support wall part 62 is a second fitting recess part 77 into which the second bearing part 72 is fitted. The second bearing part 72 fitted into the second fitting recess part 77 is held between the blocked end of the second fitting recess part 77 and the second projecting part 76 due to the cover member 34 being joined to the case member 33.

Furthermore, an end face support projection part 78 that is in line contact or point contact with at least the end face of the one end portion 60a among opposite end faces in the axial direction of the motor housing 60 is projectingly provided integrally with at least one of the case member 33 and the cover member 34, and in this embodiment a pair of end face support projection parts 78 that are in line contact with the end face of the one end portion 60a in the axial direction of the motor housing 60 on opposite sides of the first bearing part 71 are projectingly provided on the one end-side support wall part 61. Furthermore, an abutment support face 79 in surface contact with an end face of the other end part in the axial direction of the motor housing 60 on opposite sides of the second bearing part 72 is formed on the other end-side support wall part 62.

Furthermore, projectingly provided on the case member 33 are a pair of first outer peripheral face support projection parts 80 that are in point contact with the flat face 60c on an outer peripheral face close to the other end portion 60b of the motor housing 60, and projectingly provided on the cover member 34 are a pair of second outer peripheral face support projection parts 81 that are in point contact with the flat face 60d on an outer peripheral face close to the other end portion 60b of the motor housing 60.

The operation of the embodiment is now explained; since the pair of end face support projection parts 78, which are in line contact with the end face of the one end portion 60a in the axial direction of the motor housing 60 of the electric motor 40, are projectingly provided on the one end-side support wall part 61 of the case member 33, it is possible to suppress effectively the transmission of vibration of the electric motor 40 to the actuator case 31. That is, in accordance with the results of analyzing the vibrational characteristics of the electric motor 40 by the inventor of the present application, it has been found that as shown in FIG. 13 the level of vibration of the one end portion 60a on the side on which the motor shaft 41 projects in the axial direction of the electric motor 40 is the largest, and it becomes possible, by making the shape of the end face support projection part 78, which is in contact with the end face of the motor housing 60 via the portion where the vibration level is high, as a shape that is in line contact with the end face of the one end portion 60a of the motor housing 60, to suppress effectively the transmission of vibration from the electric motor 40 to the actuator case 31, thus enabling noise when operating the electric motor 40 to be reduced.

Furthermore, since the rotational reaction force acting on the electric motor 40 is received due to point contact with the outer peripheral face of the motor housing 60 by the pair of first outer peripheral face support projection parts 80 projectingly provided on the case member 33 close to the other end portion 60b of the motor housing 60 and the pair of second outer peripheral face support projection parts 81 projectingly provided on the cover member 34 close to the other end portion 60b of the motor housing 60, it becomes possible to suppress the occurrence of noise due to vibration of the electric motor 40 without using a member separate from the actuator case 31.

Figure 13:
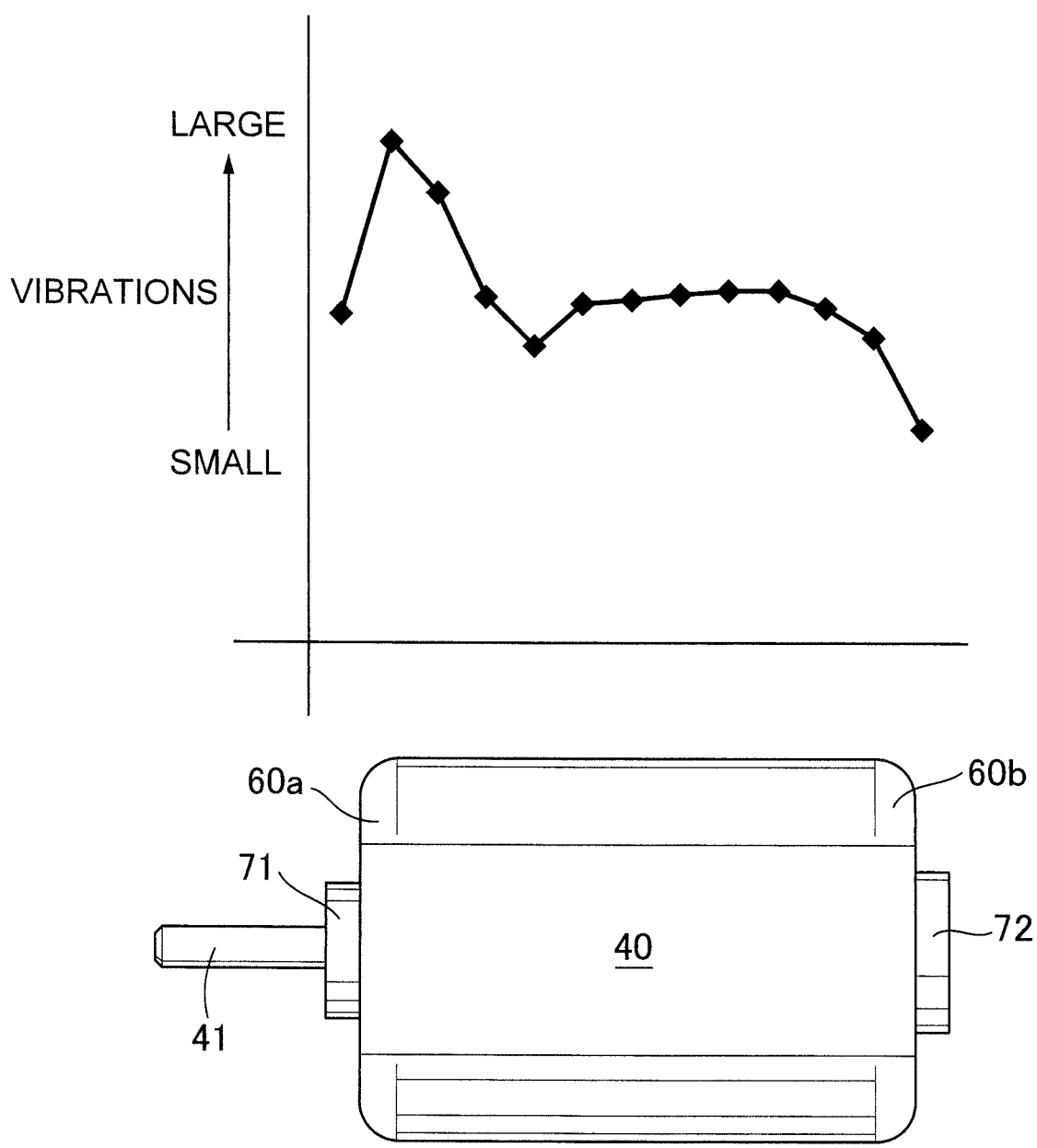
FIG. 13 is a diagram showing the distribution of vibration of an electric motor in the axial direction. (first embodiment)

Moreover, the distribution in the axial direction of vibration occurring in the electric motor 40 is as shown in FIG. 13 and the vibration is the weakest on the other end portion 60b side of the motor housing 60; due to the first and second outer peripheral face support projection parts 80 and 81 being in point contact with the outer peripheral face close to the other end portion 60b of the motor housing 60 the motor housing 60 is received by the actuator case 31 via a portion where the vibration is the lowest, and it is possible to receive the rotational reaction force of the electric motor 40 while suppressing the occurrence of noise due to vibration of the electric motor 40.

Furthermore, since the electric motor housing chambers 58A and 58B individually housing the pair of electric motors 40 are formed within the actuator case 31, the groove 65 opening toward the cover member 34 side is formed in the case member 33 between the electric motor housing chambers 58A and 58B, and the projecting wall 66 loosely inserted into the groove 65 is projectingly provided on the cover member 34, it becomes possible to form the labyrinth passage 57 between the pair of electric motor housing chambers 58A and 58B, thereby making it possible to cut the transmission of vibration between the pair of electric motor housing chambers 58A and 58B to thus reduce noise while making it unnecessary to require high dimensional precision for both the case member 33 and the cover member 34.

An embodiment of the present invention is explained above, but the present invention is not limited to the embodiment and may be modified in a variety of ways as long as the modifications do not depart from the spirit and scope of the present invention.

The invention claimed is:

1. A door mirror apparatus for a vehicle, in which an electric motor, that exerts power to swing a mirror holder holding a mirror, is housed within an actuator case disposed within a mirror housing that has a mirror housing recess part housing the mirror, wherein the mirror apparatus is configured to be installed and supported on a front side door of the vehicle,
    wherein the mirror holder comprises a receiving portion having a hollow socket formed therein,
    wherein the actuator case comprises:
    a case member that is fixed to the mirror housing, and
    a cover member that has a holder support part integrally formed as a unitary part thereof, the holder support part pivotally supporting the mirror holder thereon and having a bulbous shape that fits into the hollow socket of the mirror holder's receiving portion, the cover member being operatively attached to the case member,
    wherein a motor shaft projects from an end face of a first end portion, along an axial direction, of a motor housing of the electric motor,
    and wherein at least one end face support projection part, that is in line contact or point contact with the end face of at least said first end portion among opposite end faces in the axial direction of the motor housing, is projectingly provided integrally as a single unitary construction piece with at least one of the case member and the cover member.

2. The door mirror apparatus of claim 1, wherein the mirror housing has a housing retraction actuator therein which is configured to pivotally move the mirror housing between an operative position, in which it projects sideways from the front side door, and a retracted position, in which it is retracted toward the front side door,
    and wherein the actuator case is part of a mirror position actuator which is separate from the housing retraction actuator.

3. The door mirror apparatus of claim 1, wherein the end face support projection part comprises a pair of spaced apart ribs integrally formed as unitary parts of the case member.

4. A door mirror apparatus for a vehicle, the door mirror apparatus comprising:
- a mirror base configured to be installed on and attached to a side door of the vehicle;
- a mirror housing pivotally attached to the mirror base;
- a mirror holder disposed in the mirror housing and having a mirror affixed thereto, the mirror holder comprising a receiving portion having a hollow socket formed therein; and
- an actuator case disposed within the mirror housing, the actuator case comprising a case member that is affixed to the mirror housing, and a cover member including a holder support part integrally formed as a unitary part thereof, the holder support part pivotally supporting the mirror holder, the cover member having a bulbous shape that fits into the hollow socket of the mirror holder's receiving portion, the cover member being operatively attached to the case member,
- wherein a motor shaft projects from an end face of a first end portion along an axial direction of a motor housing of the electric motor,
- and wherein at least one end face support projection part, that is in line contact or point contact with the end face of said first end portion of the motor housing, is projectingly provided integrally as a single unitary construction piece with at least one of the case member and the cover member, said at least one end face support projection part configured to limit contact between the end face of the motor housing and the actuator case.

5. The door mirror apparatus of claim 4, wherein the mirror housing has a housing retraction actuator therein which is configured to pivotally move the mirror housing between an operative position, in which it projects sideways from the front side door, and a retracted position, in which it is retracted toward the front side door,
- and wherein the actuator case is part of a mirror position actuator which is separate from the housing retraction actuator.

6. The door mirror apparatus of claim 5, wherein at least one first side support projection part is projectingly provided on the case member in point contact with a first side surface of the motor housing, and at least one second side support projection part is projectingly provided on the case member in point contact with a second side surface of the motor housing.

7. The door mirror apparatus of claim 4, wherein the case member further comprises an end-side support wall part projectingly provided thereon and configured to closely oppose an end face of a second end portion of the motor housing opposite said first end portion.

8. The door mirror apparatus of claim 7, wherein at least one first side support projection part is projectingly provided on the case member in point contact with a first side surface of the motor housing, and at least one second side support projection part is projectingly provided on the case member in point contact with a second side surface of the motor housing.

9. The door mirror apparatus of claim 4, wherein said at least one end face support projection part comprises a pair of spaced apart ribs integrally formed as unitary parts of the case member.

10. The door mirror apparatus of claim 9, wherein the case member further comprises an end-side support wall part projectingly provided thereon and configured to closely oppose an end face of a second end portion of the motor housing opposite said first end portion.

11. The door mirror apparatus of claim 9, wherein at least one first side support projection part is projectingly provided on the case member in point contact with a first side surface of the motor housing, and at least one second side support projection part is projectingly provided on the case member in point contact with a second side surface of the motor housing.

12. The door mirror apparatus of claim 4, wherein the case member has a pair of electric motor housing chambers formed therein, and wherein at least one end face support projection part is provided in each of said electric motor housing chambers.

13. The door mirror apparatus of claim 12, wherein said at least one end face support projection part comprises a pair of spaced apart ribs integrally formed as unitary parts of each of said electric motor housing chambers of the case member.

14. The door mirror apparatus of claim 9, wherein the case member further comprises an end-side support wall part projectingly provided thereon and configured to closely oppose an end face of a second end portion of the motor housing opposite said first end portion.

15. The door mirror apparatus of claim 12, wherein the case member further comprises an end-side support wall part projectingly provided thereon and configured to closely oppose an end face of a second end portion of the motor housing opposite said first end portion.

16. The door mirror apparatus of claim 4, wherein at least one first side support projection part is projectingly provided on the case member in point contact with a first side surface of the motor housing, and at least one second side support projection part is projectingly provided on the case member in point contact with a second side surface of the motor housing.

* * * * *